(12) United States Patent
Tsai

(10) Patent No.: US 7,559,678 B2
(45) Date of Patent: Jul. 14, 2009

(54) AUTOMATIC WARNING LIGHT CONTROL DEVICE FOR AUTOMOBILES

(76) Inventor: Tsung Hsun Tsai, No. 38, Hsiao Shun Street, Sanmin District, Kaohsiung City (TW)

(*) Notice: Subject to any disclaimer, the term of this patent is extended or adjusted under 35 U.S.C. 154(b) by 204 days.

(21) Appl. No.: 11/769,720

(22) Filed: Jun. 28, 2007

(65) Prior Publication Data
US 2009/0003006 A1 Jan. 1, 2009

(51) Int. Cl.
*B60Q 1/00* (2006.01)
*B60Q 1/52* (2006.01)

(52) U.S. Cl. .................. 362/464; 340/471; 340/468; 307/116

(58) Field of Classification Search .............. 362/464, 362/540, 542; 340/471, 475, 468, 478; 307/10; 315/77
See application file for complete search history.

(56) References Cited

U.S. PATENT DOCUMENTS

| | | | | |
|---|---|---|---|---|
| 4,821,018 A | * | 4/1989 | Leistenschneider et al. | 340/471 |
| 5,414,407 A | * | 5/1995 | Gerrans et al. | 340/475 |
| 6,842,111 B1 | * | 1/2005 | Smithson | 340/468 |
| 2004/0257214 A1 | * | 12/2004 | Smithson | 340/468 |

* cited by examiner

*Primary Examiner*—Ali Alavi
(74) *Attorney, Agent, or Firm*—Leong C. Lei

(57) ABSTRACT

An automatic warning light control device is applicable to an automobile and includes a controller electrically coupled to directional signal lights of the automobile. The controller is electrically coupled to a warning light system, a windshield wiper system, at least one door of the automobile, and a trunk lid. When the windshield is activated in a rain condition, or when the door or the trunk lid is not properly closed, the controller automatically activates the warning light system, wherein both directional signal lights blink simultaneously. When the directional signal lights are used for indication of direction, the directional signal lights are automatically switched from the warning mode to a direction indication mode where only the designated directional signal light blinks. Once the direction indication operation is completed, the directional signal lights automatically go back to the warning mode to blink simultaneously.

5 Claims, 8 Drawing Sheets

AUTOMATIC WARNING LIGHT CONTROL DEVICE FOR AUTOMOBILES

BACKGROUND OF THE INVENTION (a) Technical Field of the Invention

The present invention relates to an automatic warning light control device for automobiles, and in particular to an automatic warning light control device that automatically switches between warning lighting and direction indication lighting to enhance driving safety and convenience.

(b) Description of the Prior Art

An automobile is equipped with a warning light system and a directional signal light system and both systems are operated on the same directional signal lights of the automobile. In such an automobile, the warning lighting takes priority over the directional indication lighting. Also, the left and right directional signal lights are connected in a parallel manner. Thus, when the warning light system is actuated, which means both the left and right directional signal lights are powered on to blink simultaneously, there is no way for a driver to operate any one of the directional signal lights individually.

Timing for using the warning lighting includes: (1) when the automobile malfunctions or when an unexpected situation happens to the automobile; (2) when the automobile is temporarily pulled off to park by the road; and (3) when the automobile is driven in an extremely heavy rain or poor weather. In such situations, the driver of the automobile often manually switches on the warning light system to causes both directional signal lights to blink simultaneously.

For a conventional automobile, as shown in FIG. 1, the warning light system 1 and the directional signal light system 2 share the same directional signal lights. The directional signal light system 2 is operated with a lever 21, which is often arranged by a steering wheel of the automobile. The lever 21 is operatively coupled to a blinking relay 22. A selector 221 is contained in the blinking relay 22 and is electrically connected to the left and right directional signal lights 23, 24. When the driver moves the directional signal control lever 21 to a desired direction, either left or right, the relay 22 sets, via the selector 221, the associated directional signal light 23, 24 to blink. And when the warning light system 1 is actuated, the left and right directional signal lights 23, 24 both blink at the same time to give off warning to other drivers or pedestrians. Thus, when the warning light system 1 is actuated, both the directional signal lights are put in simultaneous blinking condition and the direction indication function of the directional signal lights 23, 24 is disabled. This means there is no way that the driver may use the directional indication function of the directional signal light system 2 by simply moving the directional signal control lever 21 to the desired direction without shutting down the warning light system 1 first. For both directional signal lights are kept in the simultaneous blinking condition by the warning light system 1 and either one of the directional signal lights cannot blink alone, provided both being normally functionable. This sometimes causes traffic accidents for the drivers of the following vehicles or the drivers of the vehicles coming toward the automobile cannot identify the automobile driver's intention in changing lane or changing moving direction.

Further, when the automobile is driven in a poor weather or heavy rain, the vision of the driver is not clear and is thus very limited due to the weather. If the warning lighting is not turned on to give off warning to other drivers and pedestrians, collision or accident may easily happen. In addition, in case a large piece of article is loaded in the trunk of the automobile by which the trunk lid cannot completely closed, the unclosed trunk lid may cover the third brake light of the automobile so that the drivers of the following cars cannot clearly observe the lighting of the third brake light, and traffic accidents may thus result.

Thus, in view of the drawbacks of the common use of the directional signal lights by the warning lighting system and the directional signal light system, the present invention is aimed to provide an automatic warning light control device that overcomes the drawbacks.

SUMMARY OF THE INVENTION

The primary purpose of the present invention is to provide an automatic warning light control device for an automobile, wherein in case that the warning light system of the automobile is activated where both directional signal lights are put in blinking condition as a warning mode, the directional signal lights can be automatically switched back to the direction indication mode by simply operating the directional light control lever provided close to the steering wheel so that the desired one of the directional signal light maintain blinks while the other one shut down. Once the direction indication function is turned off, the directional signal lights automatically go back to the warning mode to simultaneously blink.

An objective of the present invention is to provide an automatic warning light control device, which comprises a controller electrically coupled to the directional signal lights of the automobile and also electrically connected to a warning light system and a windshield wiper system. When a warning light system is directly activated by a driver, the automatic warning light control device switches the left and right directional signal lights to a warning mode wherein the left and right directional signal lights blink simultaneously; and when the directional signal lights are to be used for direction indication purposes, a directional light control lever is operated and the automatic warning light control device switches one of the directional signal lights associated with the indication of direction to blink alone while shuts down the other one of the directional signal lights so that the directional signal lights resume direction indication function; and further when the directional light controller is de-actuated, the automatic warning light control device automatically switches the directional signal lights back to the warning mode to simultaneously blink both directional signal lights.

Another objective of the present invention is to provide an automatic warning light control device that comprises a detector and is electrically coupled to means controlling wiping speed of a windshield of the automobile, whereby when the wiper is powered on in a rain condition, the detector is actuated and the automatic warning light control device is activated to switch the left and right directional signal lights to a warning mode wherein the left and right directional signal lights blink simultaneously; and when the directional signal lights are to be used for direction indication purposes, a directional light control lever is simply operated and the automatic warning light control device switches one of the directional signal lights associated with the indication of direction to blink alone while shuts down the other one of the directional signal lights so that the directional signal lights resume direction indication function; and further when the directional light controller is de-actuated, the automatic warning light control device automatically switches the directional signal lights back to the warning mode to simultaneously blink both directional signal lights.

A further objective of the present invention is to provide an automatic warning light control device that comprises a detector, which is electrically coupled to an opening/closing sensor mounted in association with a door or a trunk lid of the automobile, whereby when the door or the trunk lid is not properly closed, the detector is actuated and the automatic warning light control device is activated to switch the left and right directional signal lights to a warning mode wherein the left and right directional signal lights blink simultaneously; and when the directional signal lights are to be used for direction indication purposes, a directional light control lever is simply operated and the automatic warning light control device switches one of the directional signal lights associated with the indication of direction to blink alone while shuts down the other one of the directional signal lights so that the directional signal lights resume direction indication function; and further when the directional light controller is de-actuated, the automatic warning light control device automatically switches the directional signal lights back to the warning mode to simultaneously blink both directional signal lights.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in winch a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
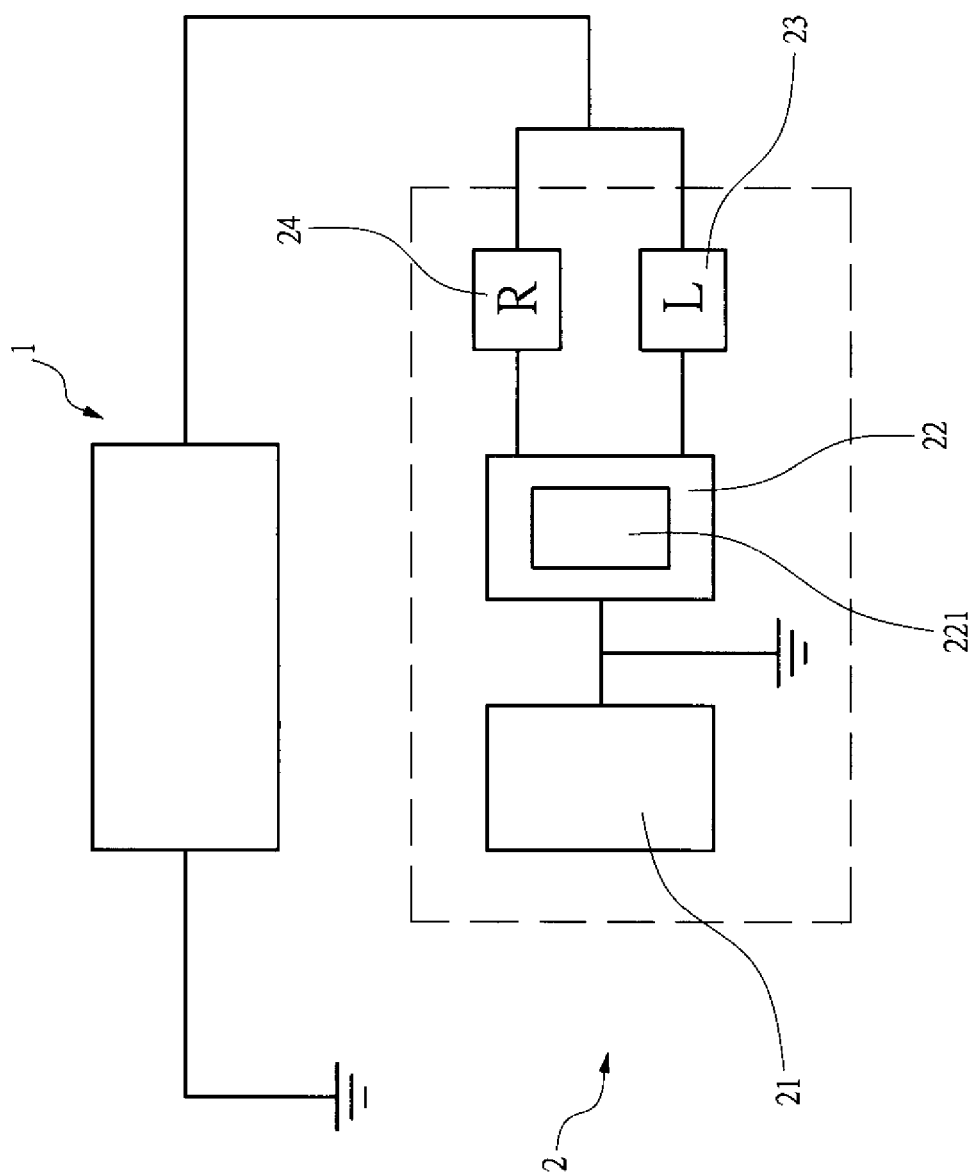
FIG. 1 is a block diagram showing a conventional control circuit of warning light and directional signal light of an automobile.
Figure 2:
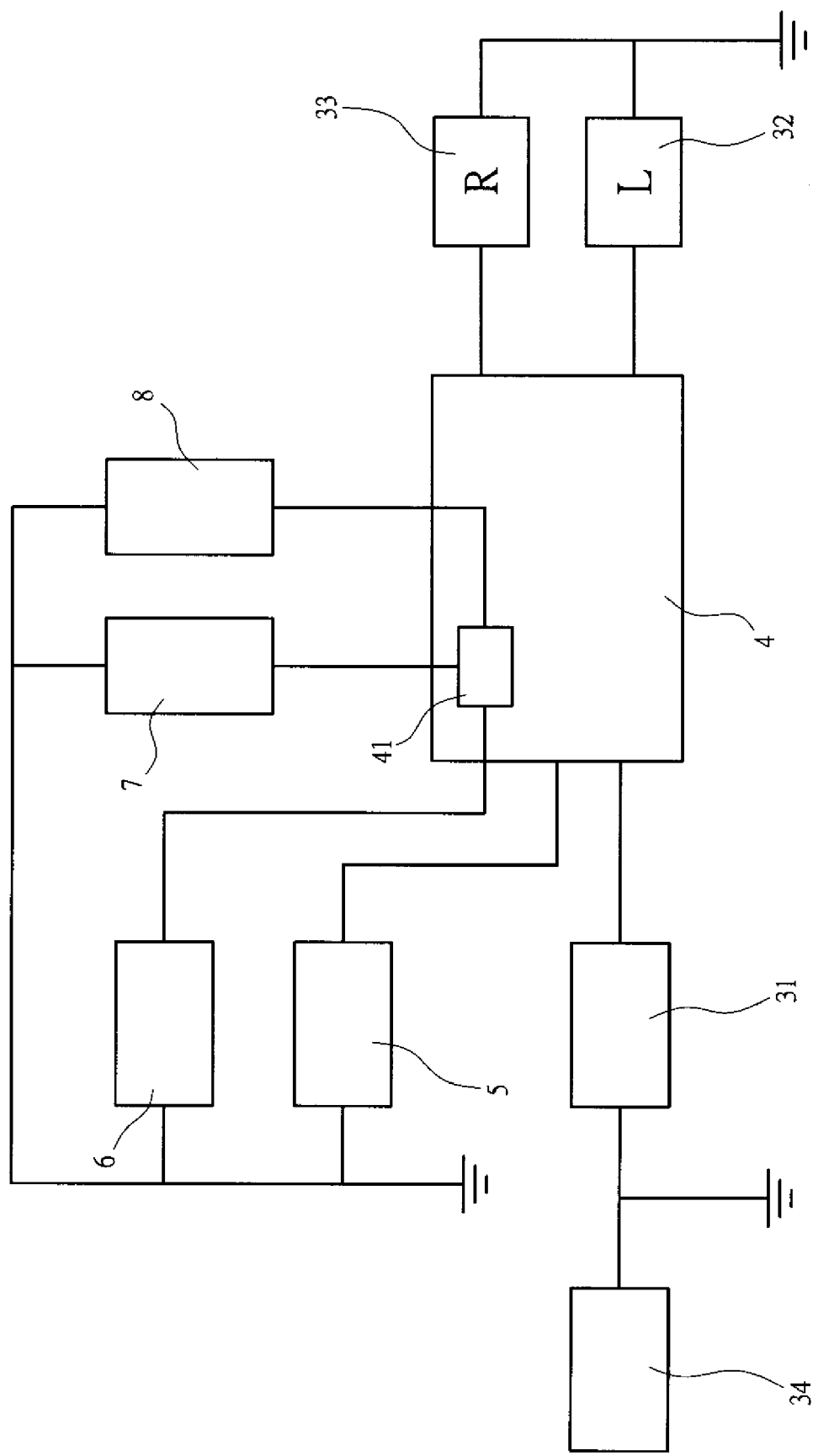
FIG. 2 is a block diagram showing a circuit of an automatic warning light control device in accordance with the present invention.

With reference to the drawings, and in particular to FIG. 2, an automatic warning light control device constructed in accordance with the present invention is applicable to automobiles and comprises a controller 4 that is arranged between a relay 31 and left and right directional signal lights 32, 33 of a directional signal light system 3 of an automobile. The controller 4 is also coupled to a warning light system 5, a windshield wiper 6, doors 7, and a trunk lid 8. The controller 4 comprises a detector 41, which is coupled to wiping speed control of the windshield wiper 6 so that when the windshield wiper 6 reaches a predetermined wiping speed, such as middle speed or high speed in a three-speed windshield wiper system, the detector 41 of the controller 4 is actuated. Further, the detector 41 is also coupled to a door opening/closing sensor 71 of at least one of the doors 7 and art opening/closing sensor 81 of the trunk lid 8 so that when the door 7 or the trunk lid 8 is not properly closed, the detector 41 of the controller 4 is also actuated. With, the actuation of the detector 41, the controller 41 activates the warning light system 5.

Figure 3:
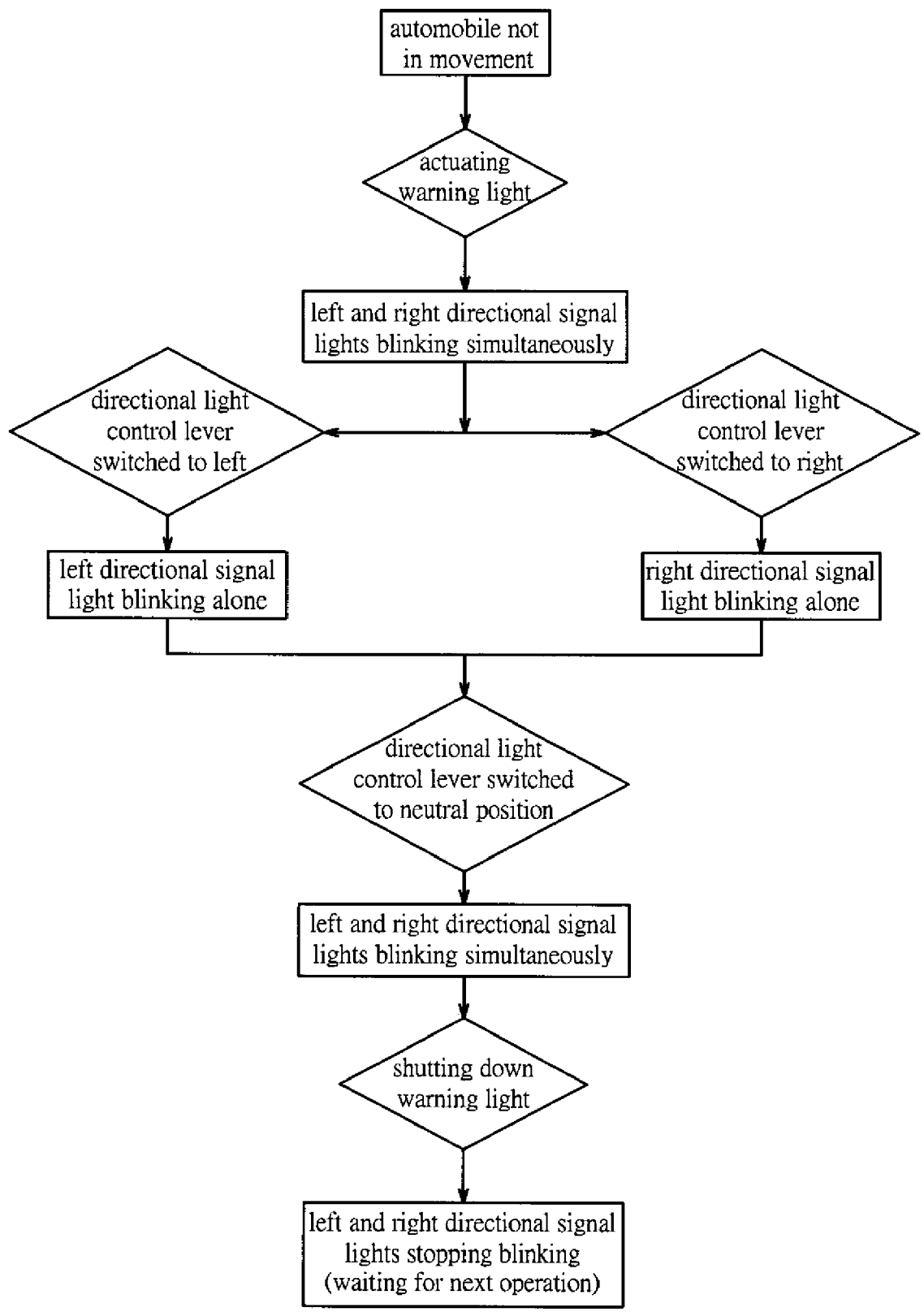
FIG. 3 is a flow chart illustrating the operation of the present invention.

Also referring to FIG. 3, in a practical application of the present invention, when the automobile stays unmoving while there is a need to activate the warning light system 5, the a user or a driver may manually operate a manual switch of the warning light system 5 to manually switch on the warning light system 5, which causes both the left and right directional signal lights to blink. At this time, when the driver intends to resume moving of the automobile and activate the directional signal light system 3 by switching a directional light controller 34 to either the left directional signal light 32 or the right directional signal light 33, the controller 41 automatically and accordingly switches to either the left direction signal light 32 or the right directional signal light 33 to cause the left of right directional signal light 32, 33 to blink alone, rather than both blinking simultaneously, completely resuming the original direction indication function of the directional signal light system. When the driver turns off the directional signal light system 3 by operating the directional light controller 34, the controller 41 gets back to the warning mode where both the left and right directional signal lights 32, 33 are blinking simultaneously.

Figure 4:
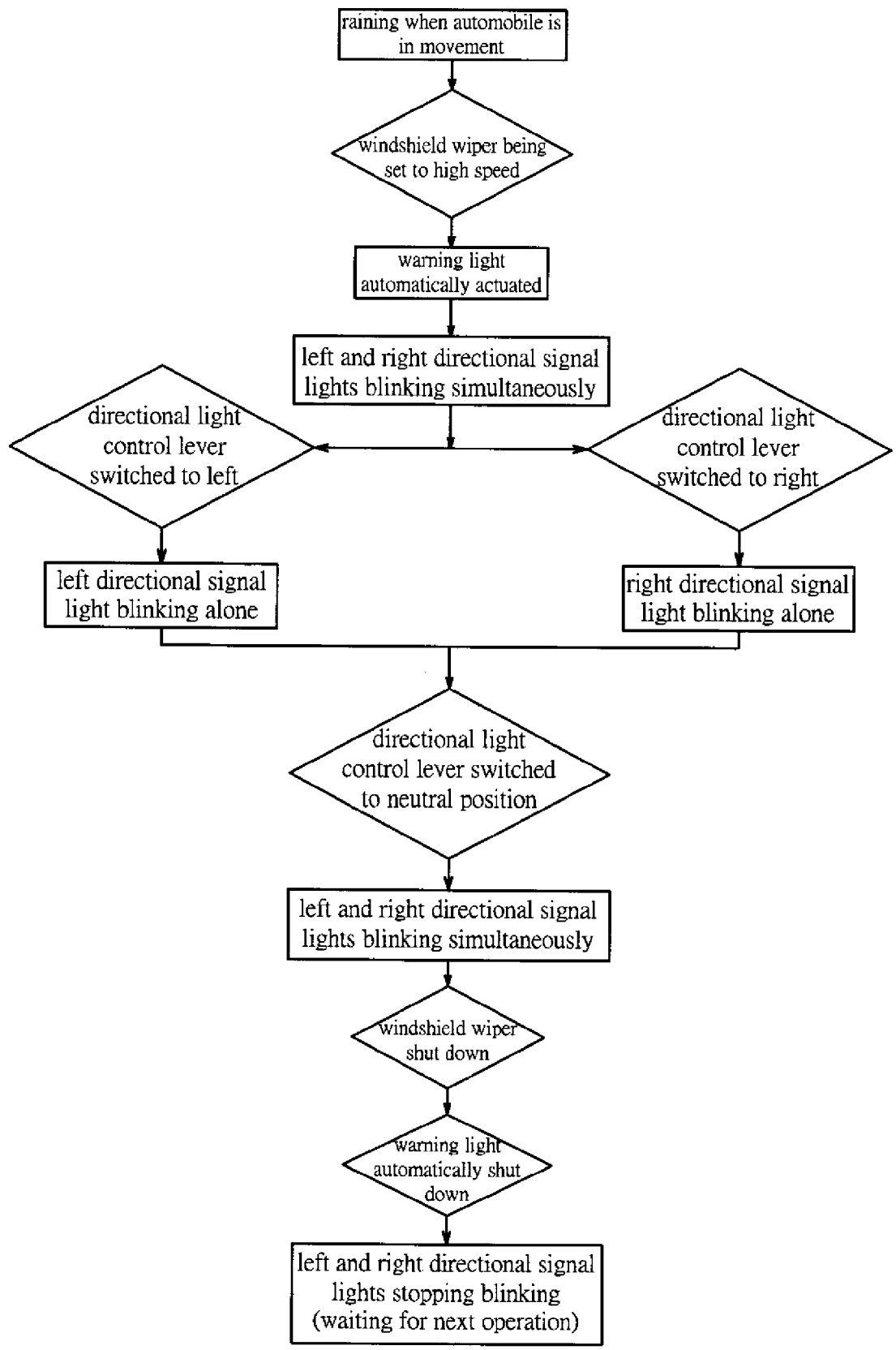
FIG. 4 is a flow chart illustrating the automatic operation of the automatic warning light control device of the present invention in a windshield wiper operating condition.

Also referring to FIG. 4, when an automobile is moving in an extremely heavy rain, which often needs the driver to turn on the headlights or the warning light system 5 to ensure driving safety, the driver will certainly not forget to turn on the windshield wiper 6 to ensure a clear vision through the windshield and will adjust the wiping speed of the wiper 6 in accordance with the amount of rain falling on the automobile. When the driver forgets to turn on the warning light system 5, the actuation of the windshield wiper 6 and the setting of the wiping speed of the wiper 6 (either manually or automatically) to a predetermined threshold causes the detector 41 of the controller 41 to receive a wiping speed signal and the controller 41 automatically switch both the left and right directional signal lights 32, 33 on to enter the warning mode for giving off warning to the following cars. During the warning mode, if the driver of the automobile needs to make a turn or change lanes, the driver switches the directional light controller 34 of the directional signal light system 3 to the desired direction, eight left or right, and the controller 4 automatically and accordingly causes the left or right directional signal light 32 or 33 to switch to blink alone and temporarily shutting down the other directional signal light. Thus, the warning light system 5 is switched to the direction indication function of the directional signal light system 3. When the directional light controller 34 is switched back to the neutral position to turn off the directional signal light system 3, the controller 4 again causes both the left and right directional signal light 32, 33 to blink simultaneously to resume the warning mode.

Figure 5:
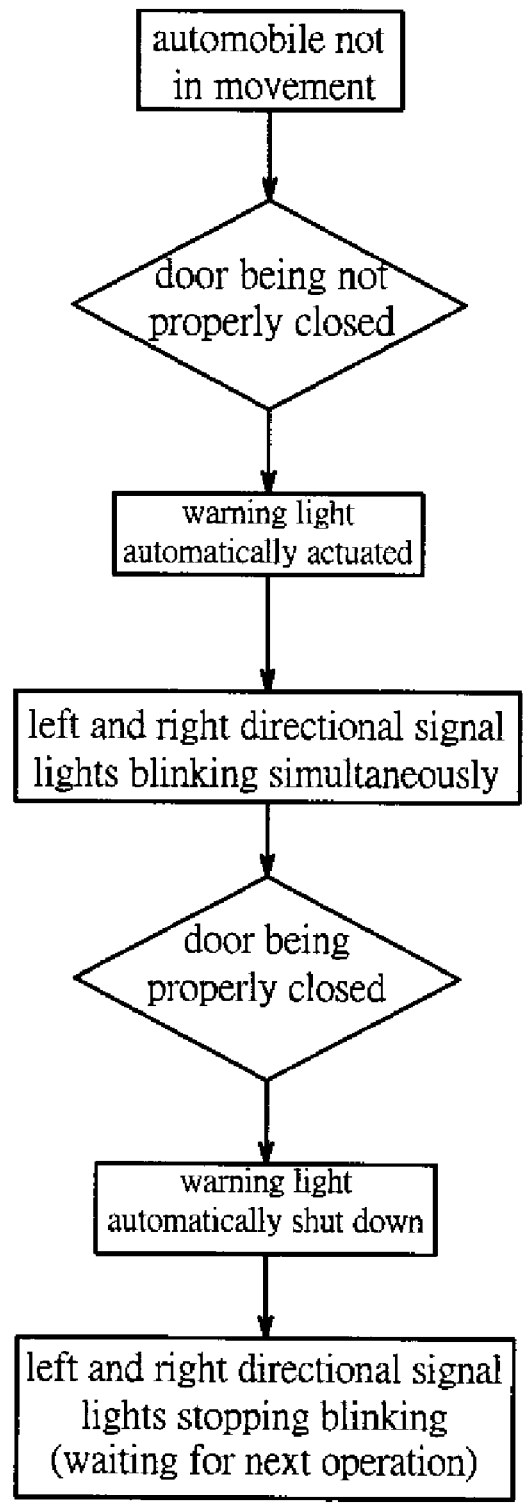
FIGS. 5 and 6 are flow charts illustrating the automatic operation of the automatic warning light control device of the present invention in door unclosed conditions.

Also referring to FIG. 5, when an automobile is in a parked condition, but one of the doors 7 is not properly closed, since the door opening/closing sensor 71 is coupled to the detector 41 of the controller 4, the improperly closed door 7 actuates the detector 41 and the detector 41 automatically activates the warning light system 5, causing both the left and right directional signal lights 32, 33 to enter the warning mode and simultaneously blink. When the door 7 is thereafter closed, the warning light system 5 automatically stops the left and right directional signal lights 32, 33 blinking.

Figure 6:
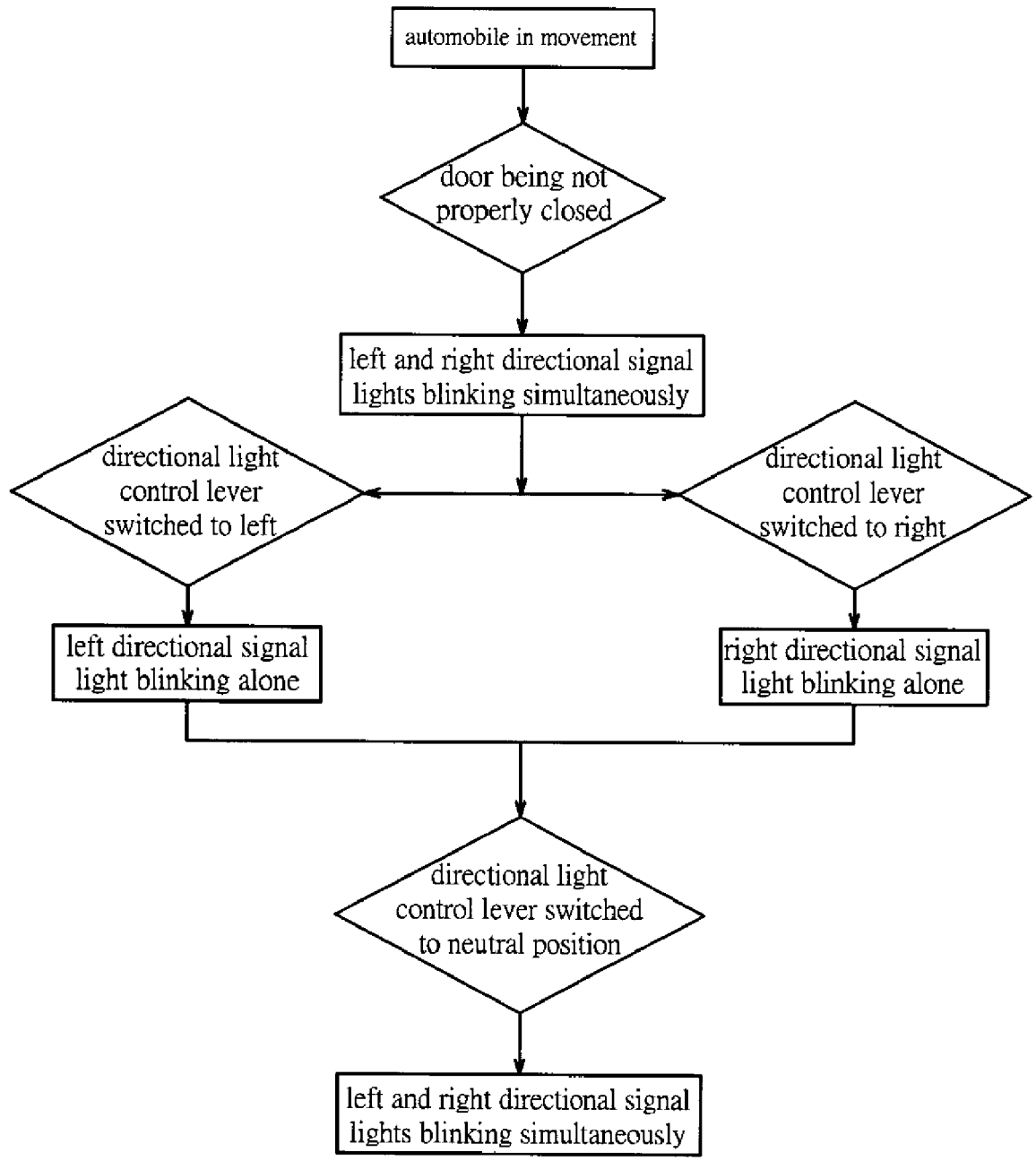

Also referring to FIG. 6, when on of the doors 7 is accidentally opened when the automobile is moving, once again the door opening/closing sensor 71 of the door 7 actuates the detector 41 of the controller 4, which in turn activates the warning light system 5, causing both left and right directional signal lights 32, 33 to simultaneously blink. Under this condition, when the driver intends to pull off the automobile or to switch lanes, the driver switches the directional light controller 34 of the directional signal light system 3 to the desired direction, and the controller 4 automatically and accordingly switches the left or right directional signal light 32, 33 to blink alone while temporarily shutting down the other directional signal light to resume the direction indication function of the directional signal light system 3. When the directional light controller 34 of the directional signal light system 3 is switched back to the neutral position to shut down the direction indication function of the directional signal light system 3, the controller 4 automatically switches the directional signal light back to the warning mode where both left and right directional signal lights are blinking simultaneously.

Figure 7:
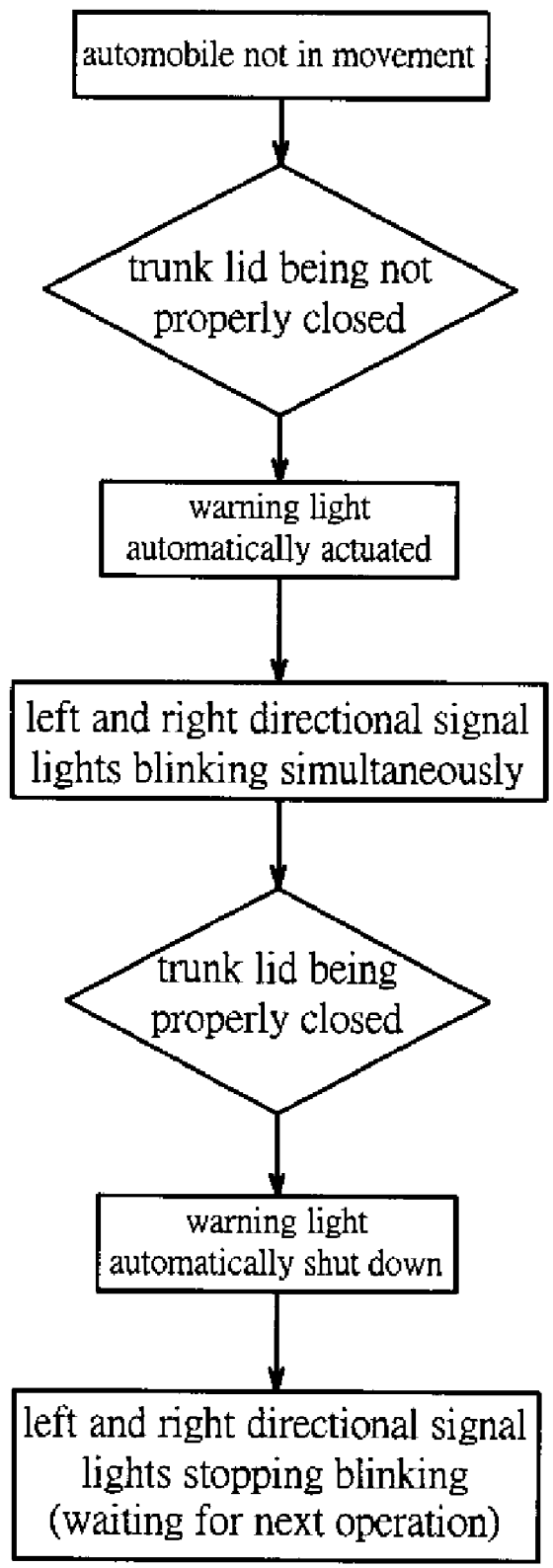
FIGS. 7 and 8 are flow charts illustrating the automatic operation of the automatic warning light control device of the present invention in trunk lid unclosed conditions.

Also referring to FIG. 7, when an automobile is in a parked condition, but the trunk lid 8 is not properly closed, since the opening/closing sensor 81 of the trunk lid 8 is coupled to the detector 41 of the controller 4, the improperly closed trunk lid 8 actuates the detector 41 and the detector 41 automatically activates the warning light system 5, causing both the left and right directional signal lights 32, 33 to enter the warning mode and simultaneously blink. When the trunk lid 8 is thereafter closed, the warning light system 5 automatically stops the left and right directional signal lights 32, 33 blinking.

Figure 8:
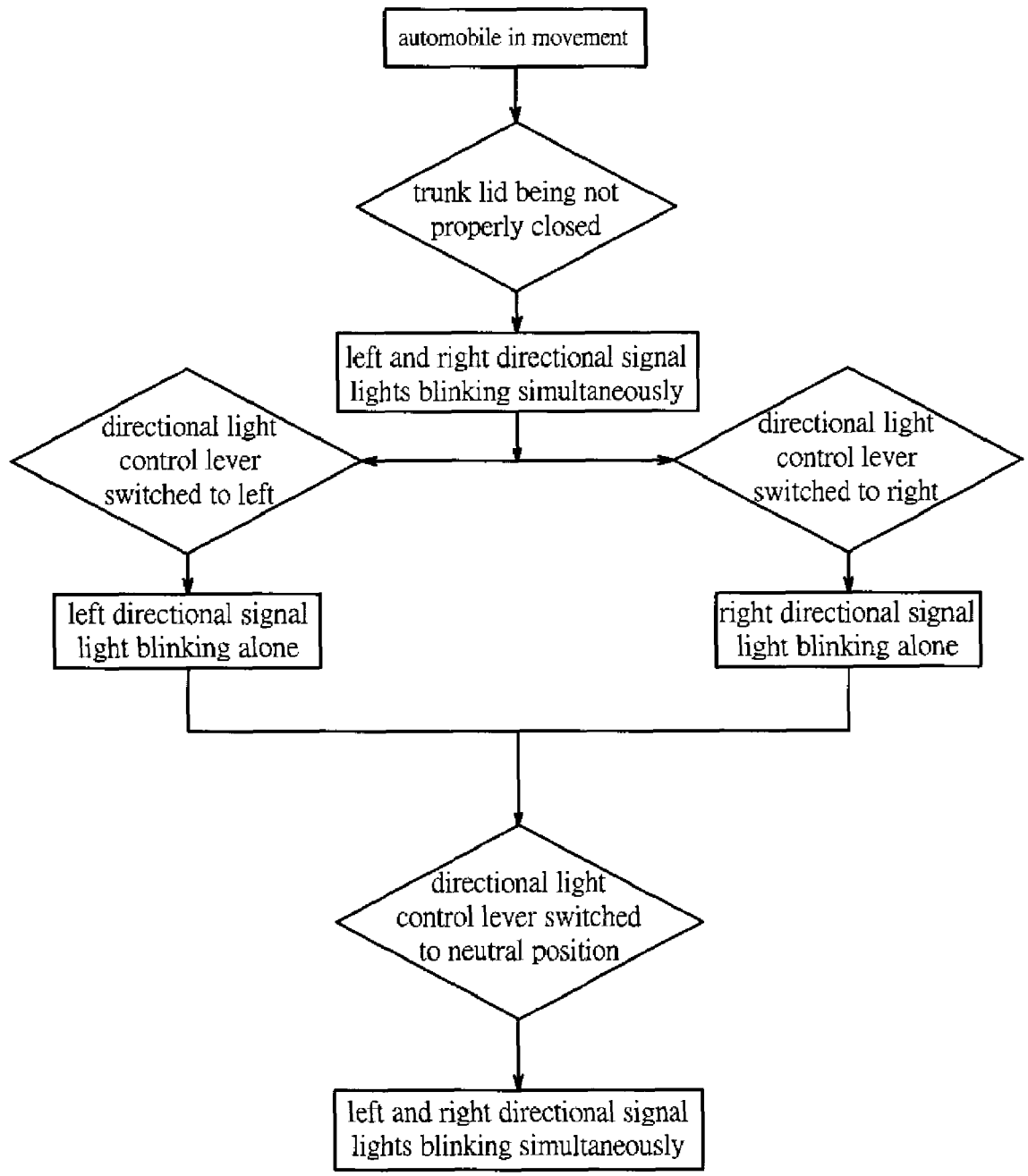

Also referring to FIG. 8, when the trunk of the automobiles is loaded with a large piece of article, making the trunk lid 8 not closed, once again the opening/closing sensor 81 of the trunk lid 8 actuates the detector 41 of the controller 4, which in turn activates the warning light system 5, causing both left and right directional signal lights 32, 33 to simultaneously blink. Under this condition, when the driver intends to use the directional signal light system 3, the driver only needs to switch the directional light controller 34 of the directional signal light system 3 to the desired direction, and the controller 4 automatically and accordingly switches the left or right directional signal light 32, 33 to blink alone white temporarily shutting down the other directional signal light to resume the direction indication function of the directional signal light system 3. When the directional light controller 34 of the directional signal light system 3 is switched back to the neutral position to shut down the direction indication function of the directional signal light system 3, the controller 4 automatically switches the directional signal light back to the warning mode where both left and right directional signal lights are blinking simultaneously.

The features of the present invention reside in that a controller 4 is coupled to the directional signal light system 3 of an automobile. When a warning light system 5 is manually and directly activated or the warning light system 5 is automatically activated by the operation of a windshield wiper 6 set to a predetermined speed, the warning light system 5 enters a warning mode and causes both left and right directional signal lights 32, 33 to blink simultaneously. When the automobile is in the warning mode and the directional signal light system 3 is operated for direction indication purposes, the directional light controller 34 of the directional signal light system 3 is switched to a desired direction, the controller 4 automatically switches the desired directional signal light 32, 33 from the warning mode to blinking along and shutting down the other directional signal light. This changes the directional signal light system 3 back to the function of direction indication. When the directional light controller 34 of the directional signal light system 3 is switched back to the neutral position to turn off the direction indication function of the directional signal light system 3, the left and right directional signal lights 32, 33 are automatically switched to the warning mode and blinking simultaneously. Further, the controller 41 is coupled to the opening/closing sensors 71, 81 of a door 7 and a trunk lid 8. When the door 7 or the trunk lid 8 is not properly closed, the detector 41 activates the warning light system 5 to cause both the left and right directional signal lights 32, 33 to simultaneously blink. When the automobile is in such a warning status and the directional signal light system 3 is operated for direction indication purposes, the directional light controller 34 of the directional signal light system 3 is switched to a desired direction, the controller 4 automatically switches the desired directional signal light 32, 33 from the warning mode to blinking along and shutting down the other directional signal light. This changes the directional signal light system 3 back to the function of direction indication. When the directional light controller 34 of the directional signal light system 3 is switched back to the neutral position to turn off the direction indication function of the directional signal light system 3, the left and right directional signal lights 32, 33 are automatically switched to the warning mode and blinking simultaneously.

Although the present invention has been described with reference to the preferred embodiment thereof, it is apparent to those skilled in the art that a variety of modifications and changes may be made without departing from the scope of the present invention which is intended to be defined by the appended claims.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and change in the forms and details of the device illustrated and in its operation can be made by those skilled in the art without departing in any way from the spirit of the present invention.

I claim:

1. An automatic warning light control device for an automobile, the automatic warning light control device being adapted to be coupled between a relay and left and right directional signal lights of a directional signal light system and characterized in that:

when a warning light system is directly activated, the automatic warning light control device switches the left and right directional signal lights to a warning mode wherein the left and right directional signal lights blink simultaneously; and when the directional signal lights are to be used for direction indication purposes, a directional light controller is actuated and the automatic warning light control device switches one of the directional signal lights associated with the indication of direction to blink alone while shuts down the other one of the directional signal lights so that the directional signal lights resume direction indication function; and further when the directional light controller is de-actuated, the automatic warning light control device automatically switches the directional signal lights back to the warning mode to simultaneously blink both directional signal lights.

2. An automatic warning light control device for an automobile, the automatic warning light control device being adapted to be coupled between a relay and left and right directional signal lights of a directional signal light system and characterized in that:

the automatic warning light control device comprises a detector, which is electrically coupled to means controlling wiping speed of a windshield of the automobile, whereby when the wiper reaches a predetermined wiping speed, the detector is actuated and the automatic warning light control device is activated to switch the left and right directional signal lights to a warning mode wherein the left and right directional signal lights blink simultaneously; and when the directional signal lights are to be used for direction indication purposes, a directional light controller is actuated and the automatic warning light control device switches one of the directional signal lights associated with the indication of direction to blink alone while shuts down the other one of the directional signal lights so that the directional signal lights resume direction indication function; and further when the directional light controller is de-actuated, the automatic warning light control device automatically switches the directional signal lights back to the warning mode to simultaneously blink both directional signal lights.

3. The automatic warning light control device as claimed in claim 2, wherein the predetermined wiping speed of the windshield wiper is set to a middle or high speed of rating wiping speeds of the wiper.

4. An automatic warning light control device for an automobile, the automatic warning light control device being adapted to be coupled between a relay and left and right directional signal lights of a directional signal light system and characterized in that:

the automatic warning light control device comprises a detector, which is electrically coupled to an opening/closing sensor of a door of the automobile, whereby when the door is not properly closed, the detector is actuated and the automatic warning light control device is activated to switch the left and right directional signal lights to a warning mode wherein the left and right directional signal lights blink simultaneously; and when the directional signal lights are to be used for direction indication purposes, a directional light controller is actuated and the automatic warning light control device switches one of the directional signal lights associated with the indication of direction to blink alone while shuts down the other one of the directional signal lights so that the directional signal lights resume direction indication function; and further when the directional light controller is de-actuated, the automatic warning light control device automatically switches the directional signal lights back to the warning mode to simultaneously blink both directional signal lights.

5. The automatic warning light device as claimed in claim 4, wherein the detector is electrically coupled to an opening/closing sensor of a trunk lid.

* * * * *